United States Patent
Bharadwaj et al.

(10) Patent No.: US 11,638,297 B2
(45) Date of Patent: Apr. 25, 2023

(54) SIDELINK NETWORK RESOURCE RESERVATION

(71) Applicant: QUALCOMM Incorporated, San Diego, CA (US)

(72) Inventors: Arjun Bharadwaj, Cupertino, CA (US); Tien Viet Nguyen, Bridgewater, NJ (US); Sudhir Kumar Baghel, Hillsborough, NJ (US); Kapil Gulati, Hillsborough, NJ (US); Shailesh Patil, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 13 days.

(21) Appl. No.: 16/868,196

(22) Filed: May 6, 2020

(65) Prior Publication Data

US 2020/0359389 A1 Nov. 12, 2020

Related U.S. Application Data

(60) Provisional application No. 62/846,551, filed on May 10, 2019.

(51) Int. Cl.
*H04W 4/70* (2018.01)
*H04W 72/56* (2023.01)
*H04W 74/08* (2009.01)

(52) U.S. Cl.
CPC ........... *H04W 72/56* (2023.01); *H04W 74/08* (2013.01)

(58) Field of Classification Search
CPC ..... H04W 76/14; H04W 72/02; H04W 74/08; H04W 74/0816; H04W 92/18; H04W 4/40; H04W 4/44; H04W 4/70; H04W 72/04; H04W 72/048; H04W 72/06; H04W 72/085; H04W 72/10
See application file for complete search history.

(56) References Cited

U.S. PATENT DOCUMENTS

| | | | |
|---|---|---|---|
| 2017/0188391 A1* | 6/2017 | Rajagopal | H04W 74/0816 |
| 2018/0199351 A1* | 7/2018 | Ro | H04W 74/0833 |
| 2019/0075548 A1* | 3/2019 | Lee | H04W 52/346 |
| 2019/0182840 A1* | 6/2019 | Feng | H04W 4/44 |
| 2021/0243749 A1* | 8/2021 | Hoang | H04W 74/085 |

OTHER PUBLICATIONS

"Sidelink Resource Allocation Mechanism for NR V2X", RI-1907271, 2019, 16 pages (Year: 2019).*

(Continued)

*Primary Examiner* — Quoc Thai N Vu
(74) *Attorney, Agent, or Firm* — Harrity & Harrity, LLP

(57) ABSTRACT

Various aspects of the present disclosure generally relate to wireless communication. In some aspects, a user equipment (UE) may receive a packet at a transmitter of the UE for transmission in a sidelink network. The UE may select one or more resources for transmission of the packet based at least in part on a reservation status of the one or more resources, wherein at least one of the one or more resources is a reserved resource that is reserved by another UE. The UE may transmit the packet using the one or more resources based at least in part on selecting the one or more resources. Numerous other aspects are provided.

30 Claims, 11 Drawing Sheets

(56) References Cited

OTHER PUBLICATIONS

International Search Report and Written Opinion—PCT/US2020/031811—ISA/EPO—dated Aug. 3, 2020.
Qualcomm Incorporated: "Sidelink Resource Allocation Mechanism for NR V2X", 3GPP Draft, 3GPP TSG RAN WG1 Meeting #97, R1-190271_Sidelink Resource Allocation Mechanism for NR V2X, 3rd Generation Partnership Project ('3GPP), Mobile Competence Centre, 650, Route Des Lucioles, F-06921 Sophia-Antipolis Cedex, vol. RAN WG1, No. Reno, USA, May 13, 2019-May 17, 2019 May 4, 2019 (May 4, 2019), XP051709294, 16 Pages, Retrieved from the Internet:URL:http://www.3gpp.org/ftp/tsg%5Fran/WG1%5FRL1/TSG1%5F97/Docs/R1%2D1907271%2Ezip [retrieved on May 4, 2019], section 5, section 4.

* cited by examiner

SIDELINK NETWORK RESOURCE RESERVATION

CROSS-REFERENCE TO RELATED APPLICATION

This Patent Application claims priority to U.S. Provisional Patent Application No. 62/846,551, filed on May 10, 2019, entitled "SIDELINK NETWORK RESOURCE RESERVATION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for sidelink network resource reservation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving a packet at a transmitter of the UE for transmission in a sidelink network; selecting one or more resources for transmission of the packet based at least in part on a reservation status of the one or more resources, wherein at least one of the one or more resources is a reserved resource that is reserved by another UE; and transmitting the packet using the one or more resources based at least in part on selecting the one or more resources.

In some aspects, a UE for wireless communication may include memory and one or more processors operatively coupled to the memory. The memory and the one or more processors may be configured to receive a packet at a transmitter of the UE for transmission in a sidelink network; select one or more resources for transmission of the packet based at least in part on a reservation status of the one or more resources, wherein at least one of the one or more resources is a reserved resource that is reserved by another UE; and transmit the packet using the one or more resources based at least in part on selecting the one or more resources.

In some aspects, a non-transitory computer-readable medium may store one or more instructions for wireless communication. The one or more instructions, when executed by one or more processors of a UE, may cause the one or more processors to: receive a packet at a transmitter of the UE for transmission in a sidelink network; select one or more resources for transmission of the packet based at least in part on a reservation status of the one or more resources, wherein at least one of the one or more resources is a reserved resource that is reserved by another UE; and transmit the packet using the one or more resources based at least in part on selecting the one or more resources.

In some aspects, an apparatus for wireless communication may include means for receiving a packet at a transmitter of the apparatus for transmission in a sidelink network; means for selecting one or more resources for transmission of the packet based at least in part on a reservation status of the one or more resources, wherein at least one of the one or more resources is a reserved resource that is reserved by another apparatus; and means for transmitting the packet using the one or more resources based at least in part on selecting the one or more resources.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based at least in part on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It is to be noted that while aspects may be described herein using terminology commonly associated with 3G and/or 4G wireless technologies, aspects of the present disclosure can be applied in other generation-based communication systems, such as 5G and later, including NR technologies.

Figure 1:
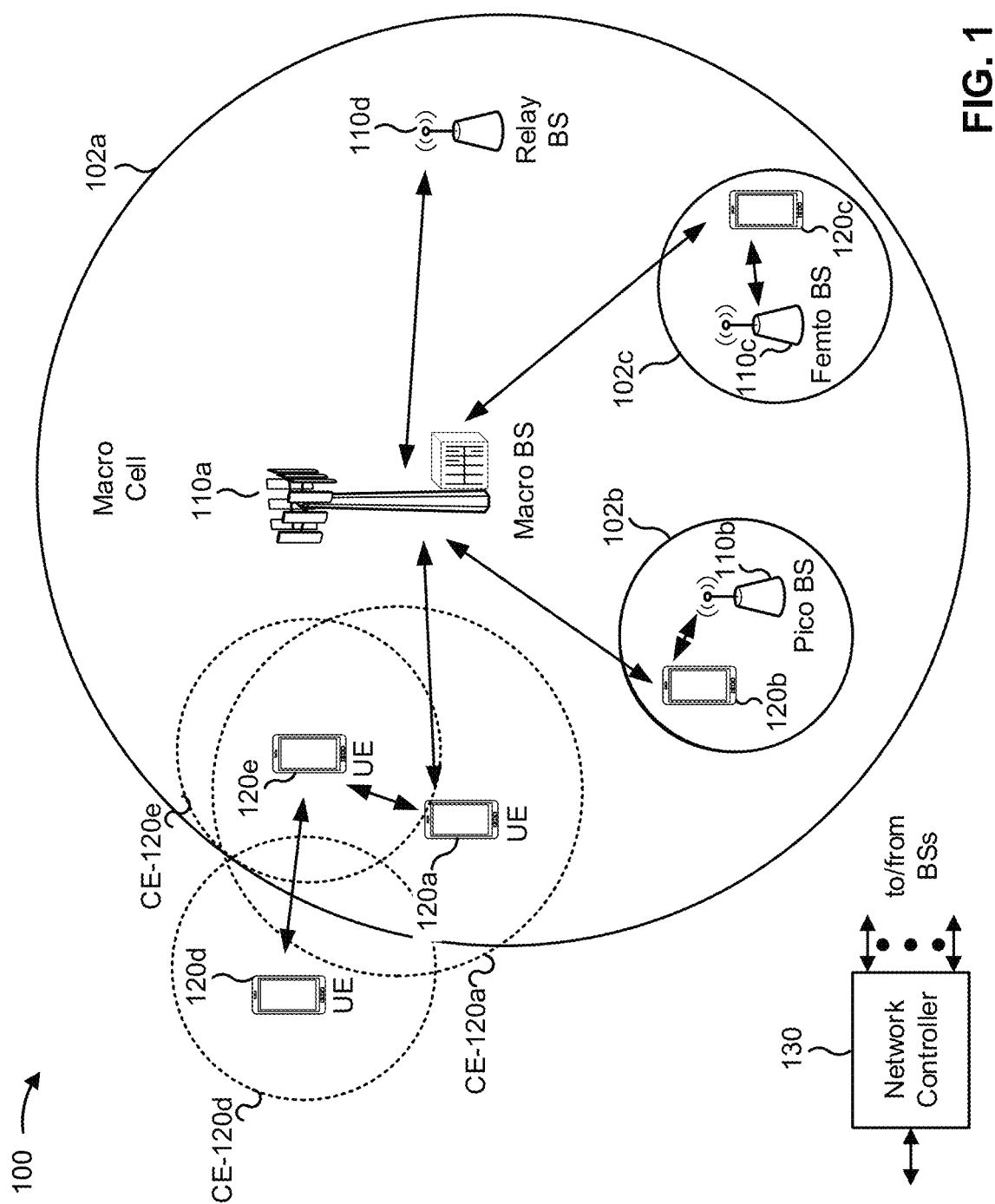
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110a may communicate with macro BS 110a and one or more other UEs (e.g., UE 120d, UE 120e, and/or the like) to facilitate communication between BS 110a and the one or more other UEs. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a, UE 120d, UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UEs 120 may perform scheduling operations, resource selection operations, and/or other operations described elsewhere herein as being performed by the base station 110.

In some aspects, each UE 120 may be associated with a control exclusion (CE) zone. For example, UE 120a may be associated with CE-120a, UE 120d may be associated with CE-120d, and UE 120e may be associated with CE-120e. The CE zones may define zones in which resources reserved by a respective UE 120 are not to be used by other UEs 120, as described in more detail herein.

Real-world applications of such sidelink communications with CE zones may include public safety, proximity services, UE-to-network relaying, V2V communications, V2I communications, V2X communications, Internet of Everything (IoE) communications, IoT communications, mission-critical mesh, and/or various other suitable applications. Generally, a sidelink signal of a sidelink channel may refer to a signal communicated from one subordinate entity (e.g., a UE 120) to another subordinate entity (e.g., a UE 120) without relaying that communication through a scheduling entity (e.g., a BS 110), even though the scheduling entity may be utilized for scheduling and/or control purposes. In some aspects, the sidelink signals may be communicated using a licensed spectrum, an unlicensed spectrum, and/or the like.

As indicated above, FIG. 1 is provided as an example. Other examples may differ from what is described with regard to FIG. 1.

Figure 2:
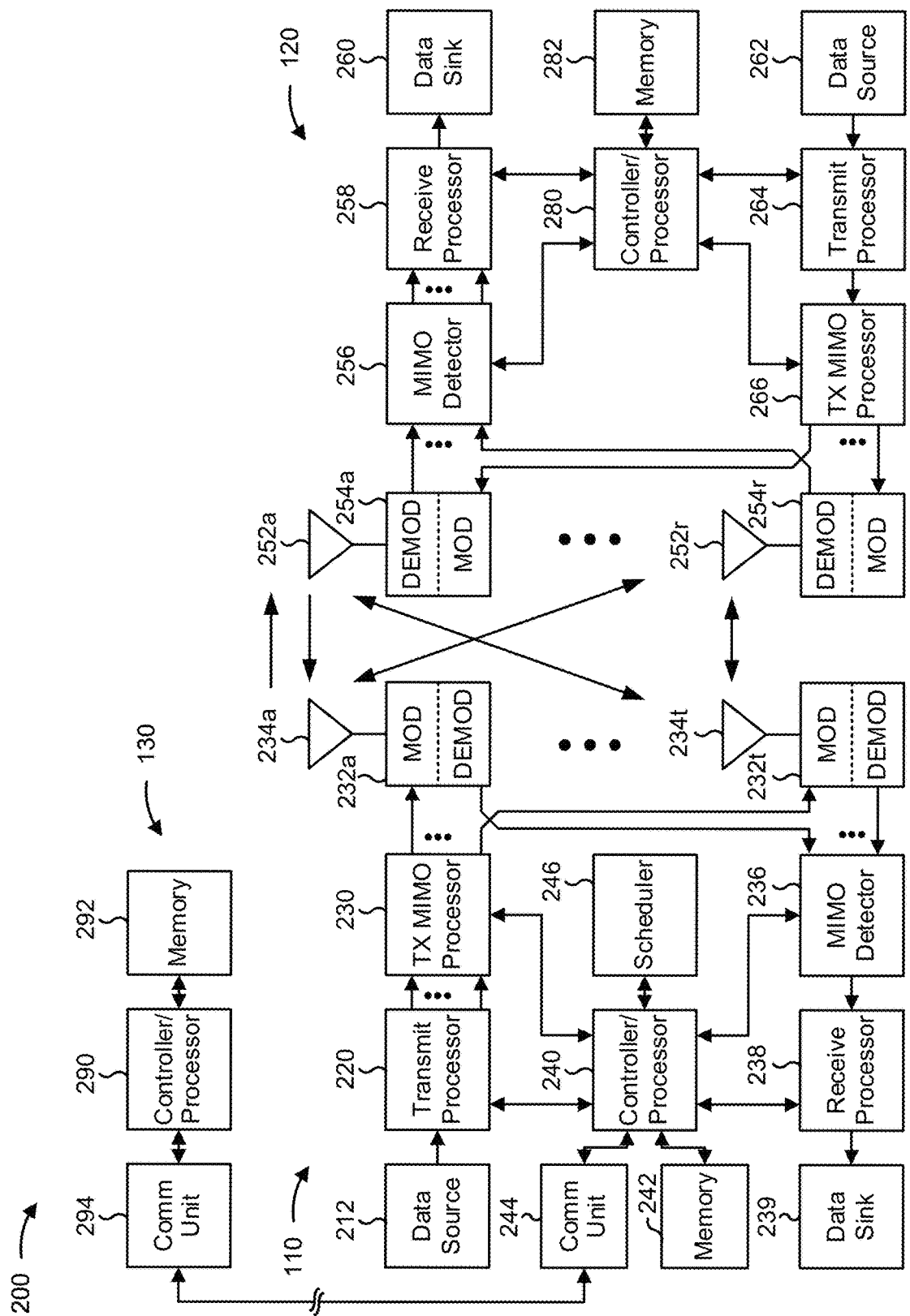
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with sidelink network resource reservation, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 606' of FIG. 7, process 800 of FIG. 8, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for receiving a packet at a transmitter of the UE for transmission in a sidelink network, means for selecting one or more resources for transmission of the packet based at least in part on a reservation status of the one or more resources, means for transmitting the packet using the one or more resources based at least in part on selecting the one or more resources, and/or the like. In some aspects, such means may include one or more components of UE 120 described in connection with FIG. 2.

As indicated above, FIG. 2 is provided as an example. Other examples may differ from what is described with regard to FIG. 2.

Figure 3A:
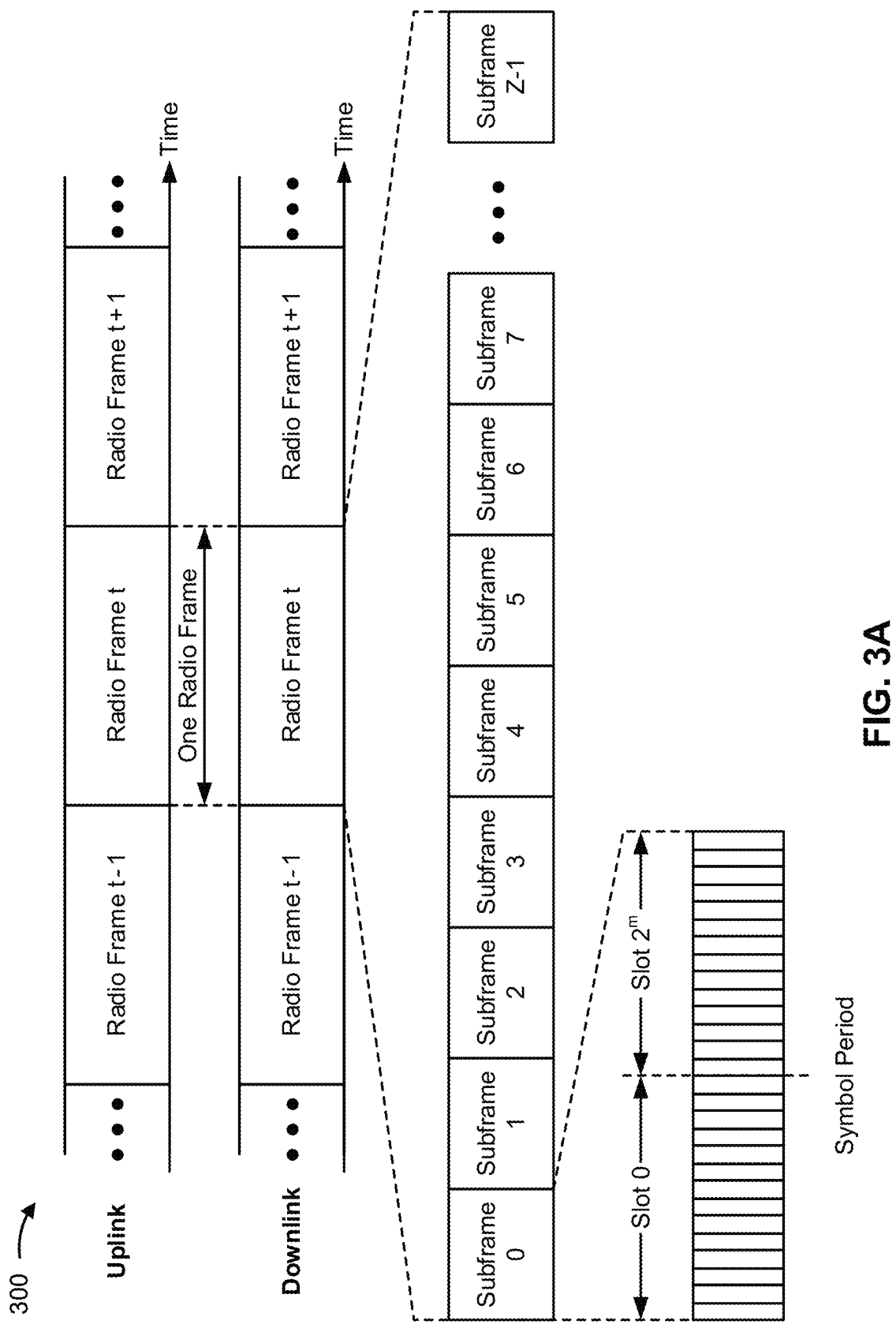
FIG. 3A is a block diagram conceptually illustrating an example of a frame structure in a wireless communication network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z–1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L–1. In some aspects, a scheduling unit for the FDD may be frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
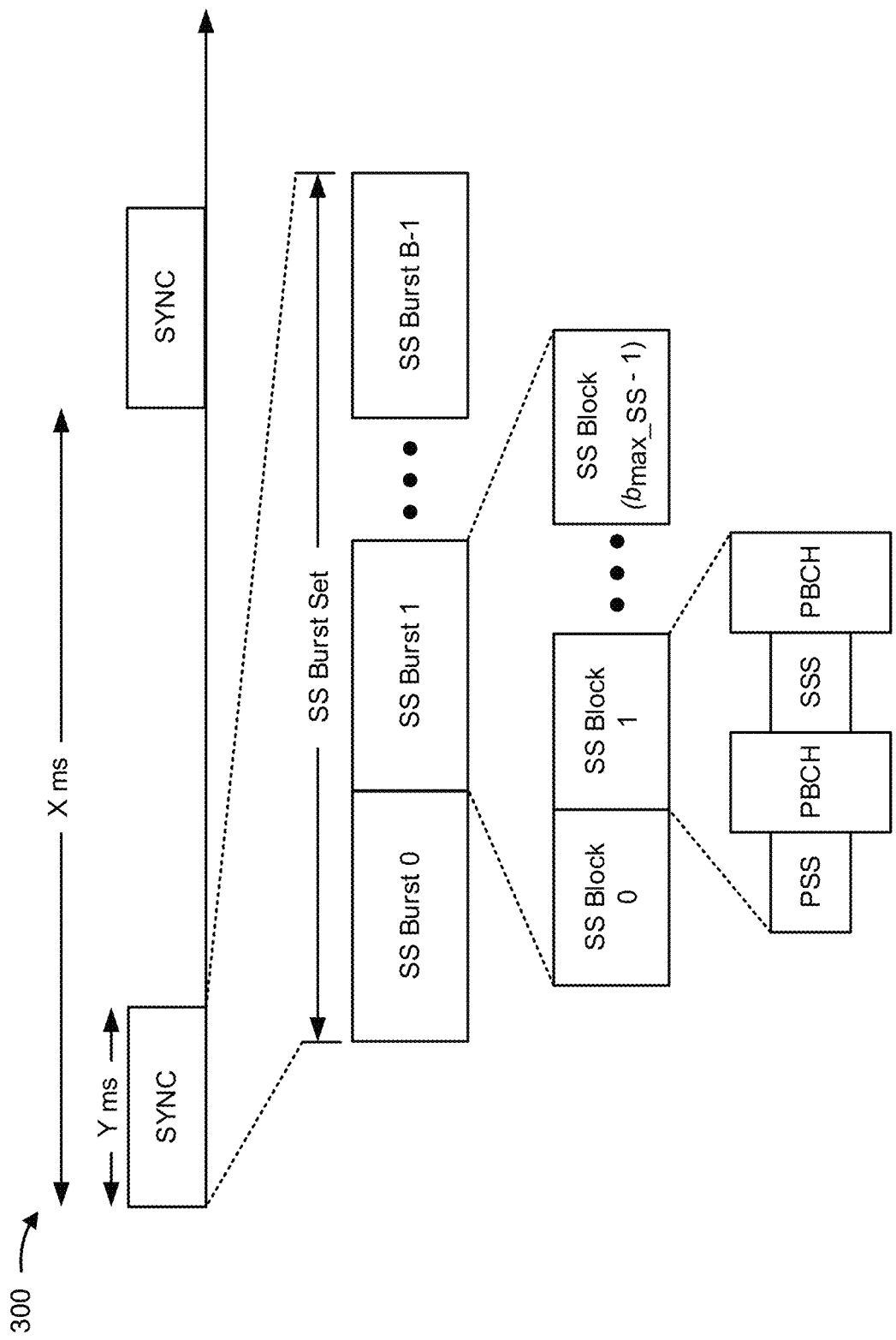
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B-1, where B is a maximum number of repetitions of the SS burst that may be transmitted by the base station). As further shown, each SS burst may include one or more SS blocks (identified as SS block 0 through SS block ($b_{max\_ss}$-1), where $b_{max\_ss}$-1 is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what is described with regard to FIGS. 3A and 3B.

Figure 4:
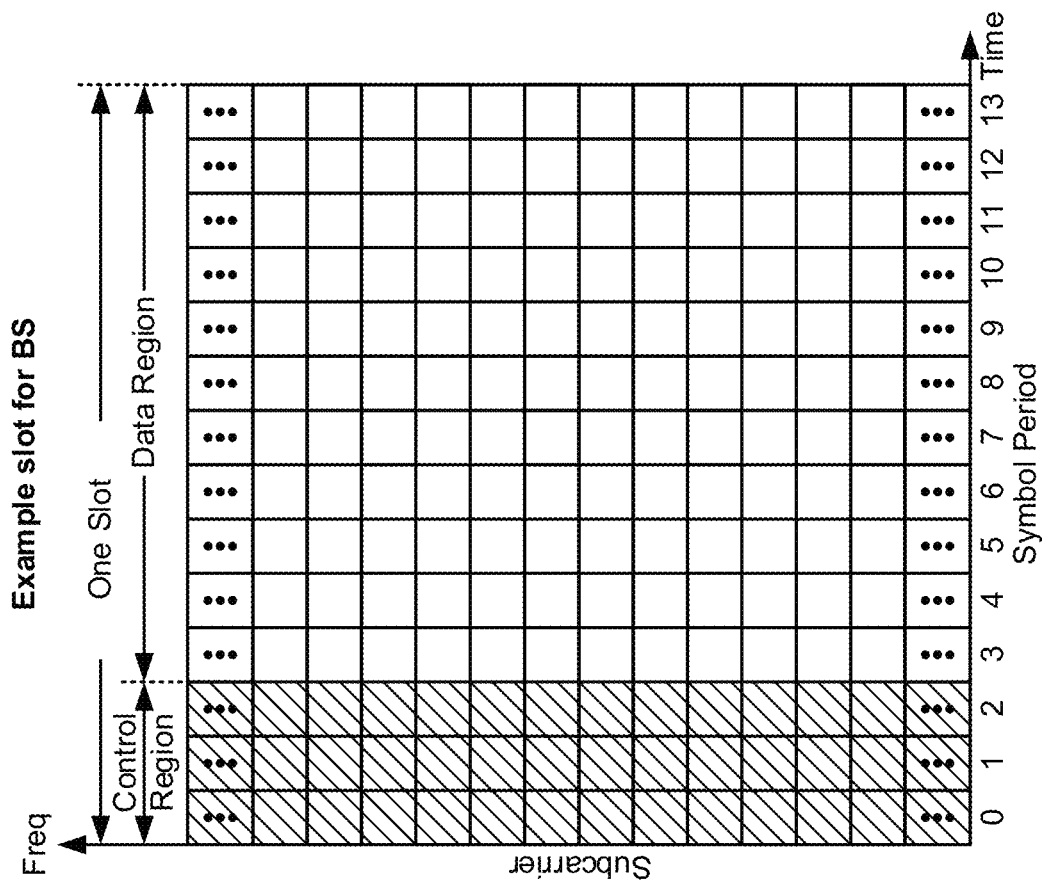
FIG. 4 is a block diagram conceptually illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q-1 may be defined, where Q may be equal to 4, 6, 8, 10, or some other value. Each interlace may include slots that are spaced apart by Q frames. In particular, interlace q may include slots q, q+Q, q+2Q, etc., where $q \in \{0, \ldots, Q-1\}$.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SNIR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New Radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHz may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such as central units or distributed units.

As indicated above, FIG. 4 is provided as an example. Other examples may differ from what is described with regard to FIG. 4.

In some communications systems, such as NR, UEs may communicate with other UEs using sidelink communications. For example, in an NR vehicle-to-everything (V2X) communications system, a first UE may transmit to a second UE, and the second UE may transmit to the first UE using a distributed channel access mechanism. In a distributed channel access mechanism, resource allocation is performed without a central scheduling unit providing scheduling information. As a result, UEs may perform contention based channel access procedures, such as a listen-before-talk (LBT) based channel access procedure.

When performing a contention based channel access procedure, a UE may take into account delay budgets associated with the given packet, such as a packet delay budget (PDB) and a hybrid automatic repeat request (HARD) delay budget (HDB), and/or the like. A PDB is a constraint dictating a maximum delay between a time of packet arrival and a time of a last transmission of the packet. For example, each packet that arrives at a transmitter of a UE for transmission by the transmitter is associated with a PDB and a quantity of transmissions (a quantity of times that the packet is to be transmitted). The PDB and the quantity of transmissions may vary among packets depending on, for example, an application or a service associated with the packet (e.g., in order to achieve a desired coverage, range, reliability, and/or the like). An HDB is a constraint dictating a maximum delay between a first transmission associated with the packet and a last transmission associated with the packet.

A UE may be configured to determine available resources based at least in part on a control exclusion (CE) zone. A CE zone is defined as an area where a resource exclusion is applied and reserved resources are avoided (e.g., such that the reserved resources are not selected for transmission). A given UE transmits CE zone information (e.g., information that defines the CE zone associated with the given UE) in a control channel (e.g., a physical sidelink control channel (PSCCH)) along with, for example, a resource reservation. A PSCCH may include a two-stage PSCCH with some control information in a first stage of the PSCCH located in symbols reserved for control communications (e.g., the control region of FIG. 4) and a second stage of the PSCCH located in symbols reserved for data or shared transmission (e.g., the data region of FIG. 4). For example, a PSCCH may be transmitted with or without a physical sidelink shared channel (PSSCH), where the PSCCH includes data or other non-control information. A CE zone can be, for example, signal-based (e.g., based at least in part on a reference signal received power (RSRP) and/or the like) or distance-based (e.g., based at least in part on a radial distance in, for example, meters). All UEs receiving the control channel may therefore decode the control channel in order to determine (and maintain) a resource allocation map based at least in part on resource reservations and indicated CE zones.

One issue with the use of CE zones is that if there are many UEs reserving resources, a channel can become congested to a point that there are not enough resources available to use for a transmission. For example, a set of free resources (e.g., resources that are not already reserved by other UEs for which a particular UE is within a CE zone) may be less than an amount of resources that the particular UE needs to in order to transmit a particular packet. This can lead to significant delay, which may result in violation of a delay budget for the particular packet.

Some techniques and apparatuses described herein provide for priority-based sidelink network resource reservation. For example, when an amount of free resources is not enough resources for a first UE to transmit a packet, the first UE may identify a subset of reserved resources (e.g., reserved by second UE(s) for which the first UE is within a CE zone) with lowest reference signal received powers (RSRPs) relative to other reserved resources. In this case, the first UE may select one or more reserved resources from the subset of reserved resources for which the UE has a higher priority than the second UE(s) that reserved the one or more reserved resources.

In this way, the first UE may override or preempt a reservation of a resource by the second UE(s), thereby accounting for a prioritization of UEs in resource reservation for sidelink communications. Moreover, based at least in part on using prioritization as a factor in resource reservation, the first UE enables resource reservation in, for example, congested V2X communications systems so that a PDB constraint and/or an HDB constraint are not violated, as described in more detail herein.

Figure 5A:
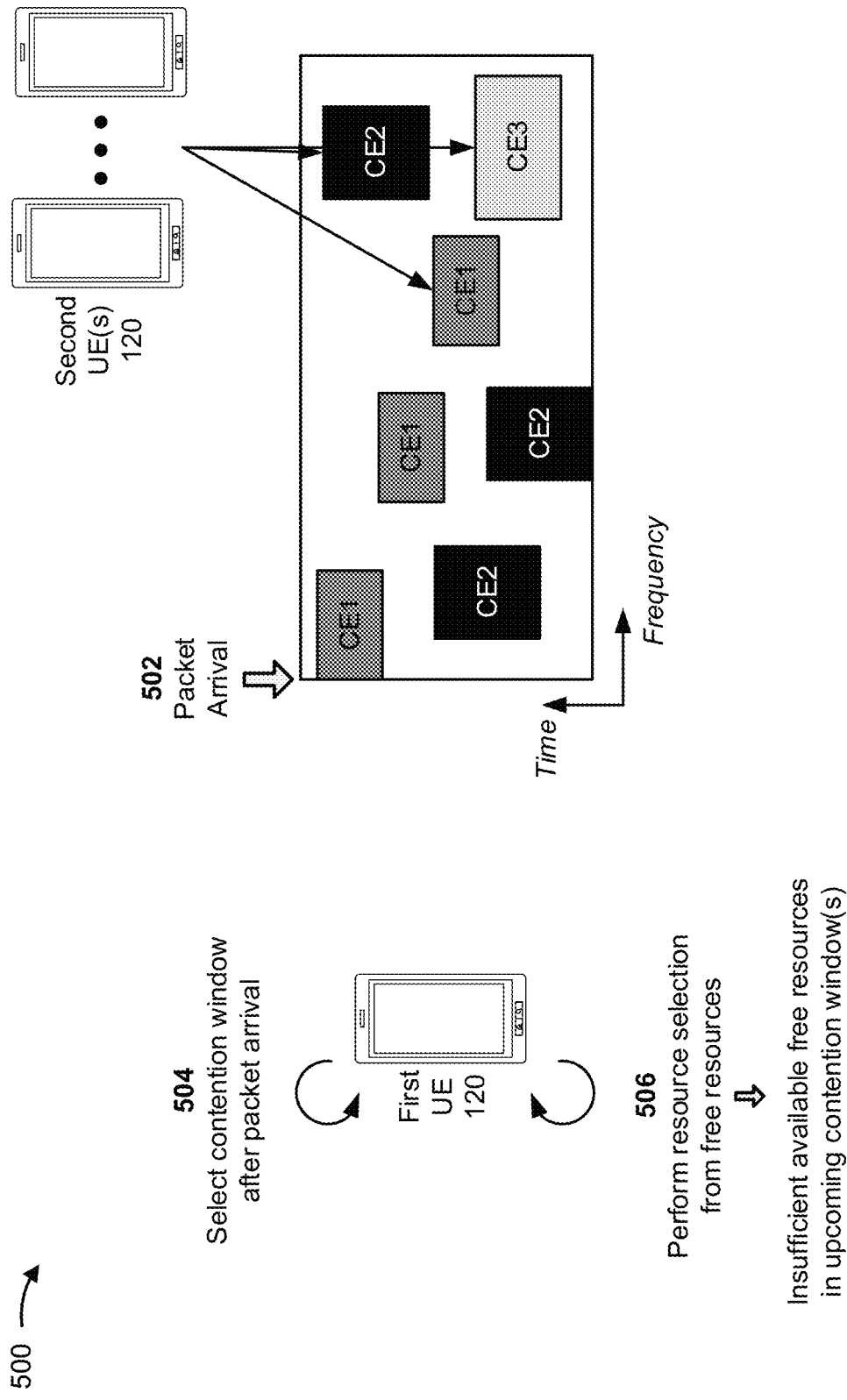
FIGS. 5A-5C are diagrams illustrating an example of physical sidelink control channel (PSCCH) resource reservation, in accordance with various aspects of the present disclosure.
Figure 5B:
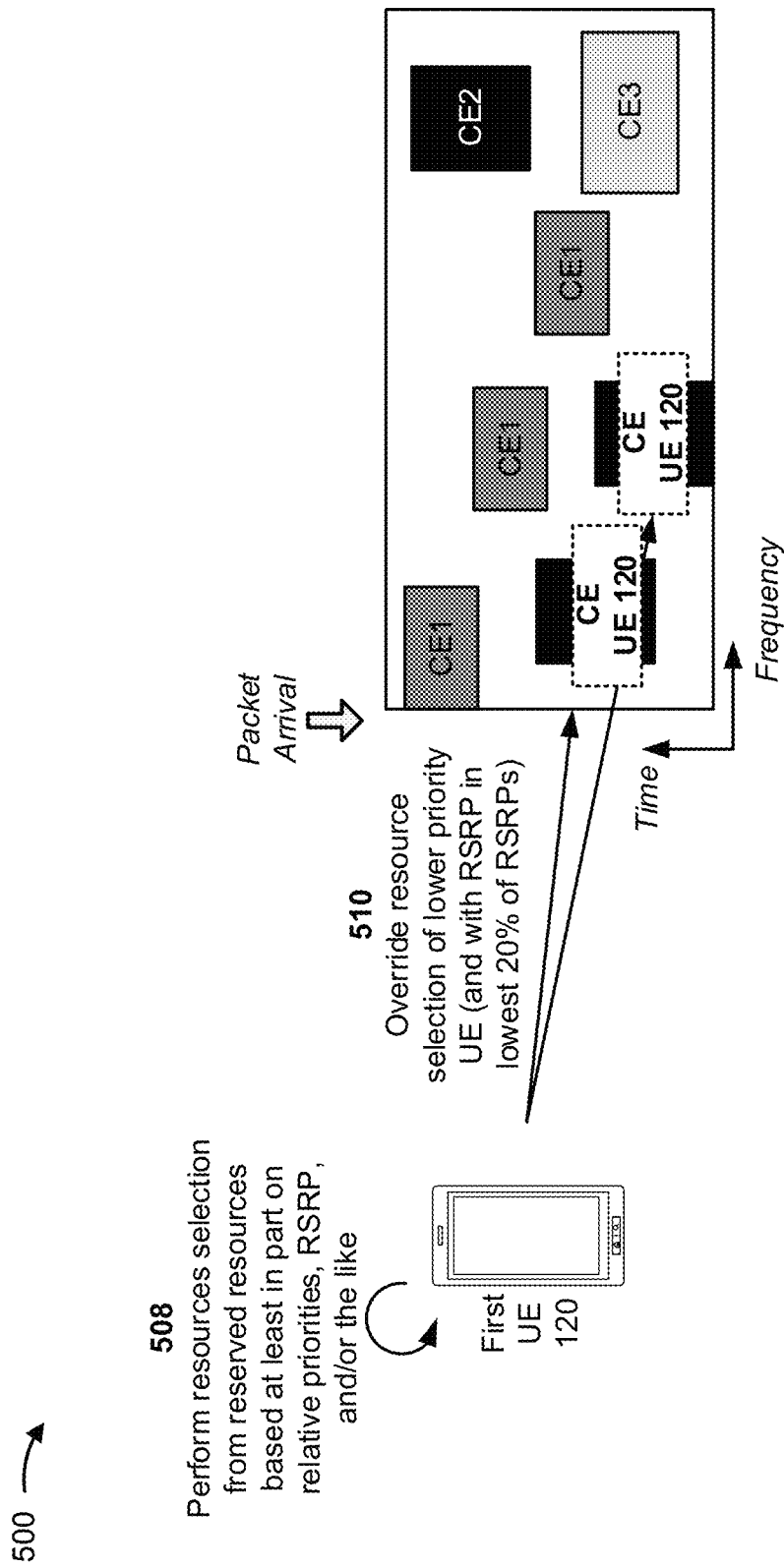
Figure 5C:
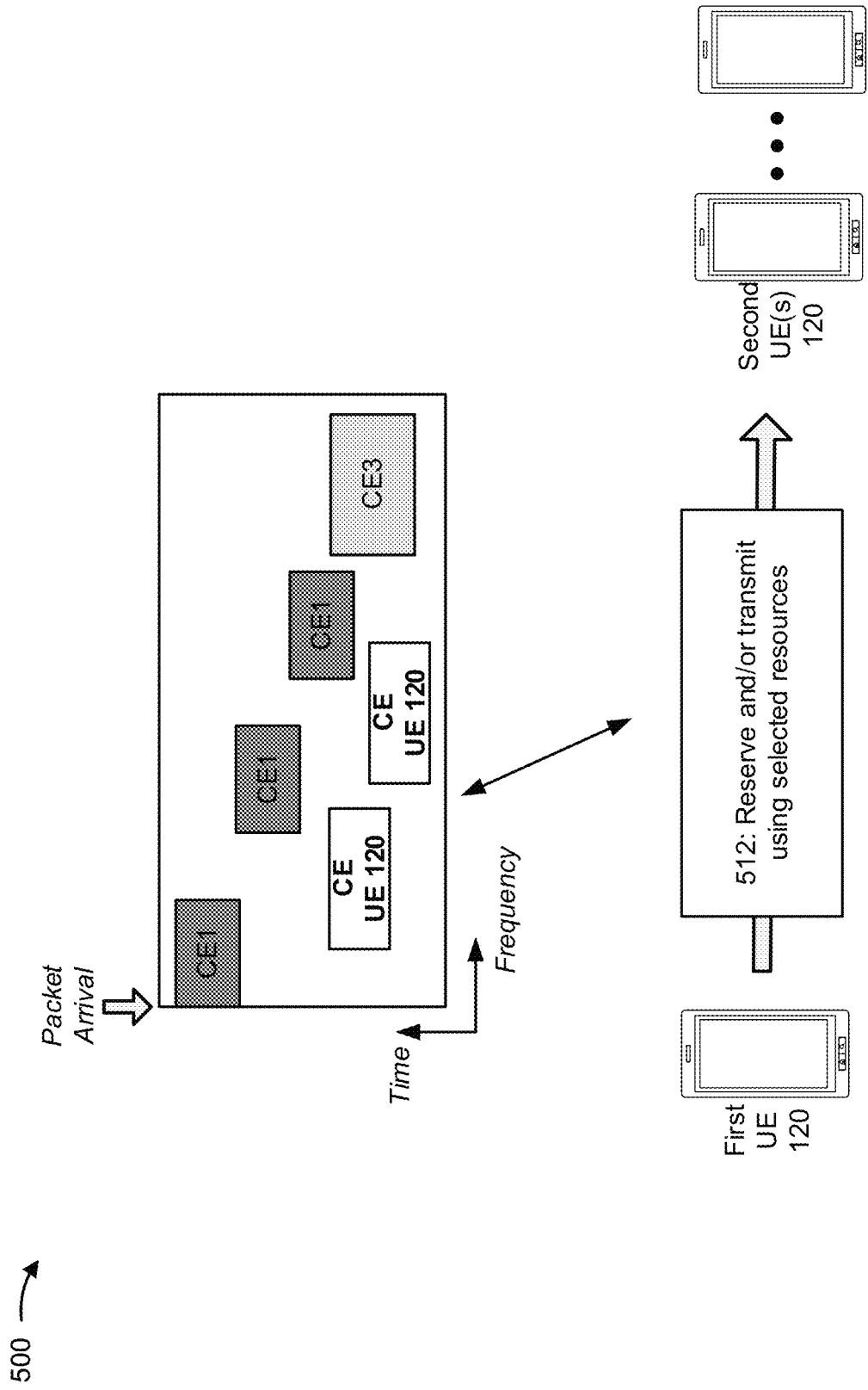

FIGS. 5A-5C are diagrams illustrating an example 500 of resource reservation. As shown in FIGS. 5A-5C, example 500 may include a first UE 120 that is to communicate in a network that includes second UE(s) 120 (also referred to as "other" UEs 120). The resource reservation may be used for the transmission of data or control information.

As further shown in FIG. 5A, and by reference number 502, the first UE 120 may receive a packet at a particular time. For example, the first UE 120 may receive the packet at a transmitter of the first UE 120 for transmission by the transmitter of the first UE 120. The packet may be associated with a PDB, an HDB, and a quantity of retransmissions (e.g., an initial transmission, a set of retransmissions, and/or the like) that are to be performed. For example, the packet may be associated with a PDB of 100 milliseconds (ms), an HDB of 32 ms, and a quantity of retransmissions (N) of 4.

As further shown in FIG. 5A, and by reference number 504, the first UE 120 may select a contention window in which to attempt to reserve resources. For example, the first UE 120 may select the contention window based at least in part on the PDB, the HDB, the quantity of retransmissions, and/or the like. In this case, a size of the contention window may be determined as CW=minimum(PDB, HDB)/(N/K) where K is a quantity of packets being reserved.

In some aspects, the first UE 120 may identify resources with the contention window. For example, within the PDB, the first UE 120 may iteratively set the contention window, determine whether resources are available in the contention window (as described below) and, if resources are unavailable, change the contention window and determine whether resources are available in the changed contention window. In this case, a size of the contention window may remain static, but the contention window may be moved in time with respect to the PDB. Similarly, when the first UE 120 determines that resources are not available at any position of the contention window within the PDB, the first UE 120 may scale a CE zone and may attempt to identify resources in a contention window at a position within the PDB after scaling the CE zone, as described in more detail below.

As shown by reference number 506, the first UE 120 may attempt to select resources from a set of free resources. For example, the first UE 120 may identify resource reservations of the second UE(s) 120, such as a set of resource reservations by a second UE 120 associated with a first CE zone, CE1; a set of resource reservations by a second UE 120 associated with a second CE zone, CE2; a set of resource reservations by a second UE 120 associated with a third CE zone, CE3; and/or the like. In this case, the first UE 120 may determine that one or more free resources are available (e.g., one or more resources are not reserved by the second UE(s) 120), and may attempt to reserve the one or more free resources.

In some aspects, the one or more free resources may be unreserved by any other UE 120 for which the first UE 120 is within a CE zone. For example, the first UE 120 may determine that a particular free resource is not reserved by any nearby second UE 120, and may select the particular free resource for reservation. In this case, the first UE 120 may select the particular free resource, from one or more other free resources, based at least in part on the particular free resource being a sequentially earliest free resource. Additionally, or alternatively, the first UE 120 may use a random resource selection procedure to randomly select from a set of free resources that are unreserved by any nearby second UE 120.

In some aspects, the one or more free resources may be reserved by another UE 120 for which the first UE 120 is not within a CE zone. For example, the first UE 120 may detect a resource reservation of a second UE 120, but may determine that a CE zone of the second UE 120 does not include the first UE 120 (e.g., the first UE 120 is a threshold distance from the second UE 120). In this case, the first UE 120 may select a resource reserved by the second UE 120 as a free resource for reservation. In some aspects, the first UE 120 may select the free resource based at least in part on an order of free resources (e.g., the first UE 120 may select a sequentially first free resource). Additionally, or alternatively, the first UE 120 may select from the free resources based at least in part on a random resource selection procedure. Additionally, or alternatively, the first UE 120 may select the free resource based at least in part on an RSRP associated with the second UE 120 that reserved the free resource. For example, the first UE 120 may determine a first RSRP of a resource reservation transmission of the second UE 120 (e.g., when decoding the resource reservation transmission and determining that the first UE 120 is a threshold distance from the second UE 120). In this case, the first UE 120 may select the free resource based at least in part on determining that the first RSRP is lower than second RSRPs of other resource reservations by other second UEs 120 that are also a threshold distance from the first UE 120.

In some aspects, UE 120 may reserve a plurality of free resources. For example, UE 120 may reserve the plurality of free resources for transmission of payload data (e.g., the packet). Additionally, or alternatively, UE 120 may reserve first free resources for transmission of a resource reservation that reserves second free resources, which may be used for transmission of the payload data. Additionally, or alternatively, UE 120 may reserve free resources for one or more retransmissions of the payload data.

As shown in FIG. 5B, and by reference number 508, when there is an insufficient amount of free resources available for reservation (e.g., less free resources than is needed to transmit the packet), the first UE 120 may determine to perform resource selection from reserved resources (e.g., for which UE 120 is within a CE zone). For example, the first UE 120 may identify RSRPs associated with reserved resources (e.g., RSRPs of resource reservation transmissions by second UEs 120, within a threshold proximity of the first UE 120, to reserve the reserved resources). In this case, the first UE 120 may rank the reserved resources based at least in part on the RSRPs, and may select a subset of reserved resources associated with lowest RSRPs relative to other RSRPs (e.g., reserved resources that have the lowest, for example, 20% of RSRP values). In some cases, the first UE 120 may rank the reserved resources based at least in part on distances between the first UE and the second UEs 120. Further, the first UE 120 may select, from the subset of reserved resources with the lowest RSRPs, one or more reserved resources based at least in part on priorities of the one or more reserved resources. For example, the first UE 120 may determine a priority of a second UE 120 that reserved a reserved resource, and determine that the first UE 120 is associated with a higher priority than the priority of the second UE 120. In some aspects, each resource reservation by the UE 120 or other device may indicate a priority. For example, with a two-stage PSCCH the priority may be indicated in one or more of a resource reservation in a first stage of the PSCCH or a resource reservation in the second stage. In this case, UE 120 may pre-empt or override a reservation of the reserved resource by the second UE 120, as shown by reference number 510.

In some aspects, UE 120 may cause the second UE 120 to release the reserved resource when UE 120 reserves the reserved resource. For example, when the first UE 120 overrides the reservation of a reserved resource by a second UE 120, the second UE 120 may release the reserved resource, thereby reducing a likelihood of collision and improving reliability of transmission. The second UE 120 may release the reservation by refraining from transmitting in the corresponding resource and instead attempting to reserve a different resource, thereby avoiding causing interference with a transmission of the first UE 120. In this case, the second UE 120 may perform a resource reselection procedure to obtain new resources for transmission. For example, the second UE 120 may select free resources to replace pre-empted resources, may scale a CE value to identify free resources, and/or the like. In some aspects, the second UE 120 may drop a transmission or retransmission during the reserved resource based at least in part on resources of the second UE 120 being preempted by the first UE 120.

In some aspects, to override a resource reservation of a second UE 120, the first UE 120 may first identify priorities associated with reserved resources, and may rank the reserved resources based at least in part on the priorities. In this case, the first UE 120 may select a subset of reserved resources associated with lowest priorities (and lower than a priority of the first UE 120) relative to other priorities (e.g., reserved resources that have the lowest 20% of priority values). Further, the first UE 120 may select, from the subset of reserved resources with the lowest priorities, one or more reserved resources with the lowest RSRPs of the one or more reserved resources. In some cases, the first UE 120 may select, from the subset of reserved resource with the lowest priorities, one or more reserved resources associated with UEs 120 with the highest distances from the first UE 120.

In another example, when an amount of reserved resources (and/or free resources) is not enough to, for example, transmit the packet, UE 120 may scale the CE value and perform another attempt to select resources. For example, UE 120 may scale the CE zones by a particular percentage or a historical resource availability (e.g., a CE scaling factor), may sweep the new contention window (e.g., iteratively to check resource availability of free resources and/or reserved resources at each possible position of the contention window with respect to the PDB), and may attempt to reserve resources. In this case, if UE 120 determines that the CE value is scaled to a maximum or minimum CE value, UE 120 may determine that there are not sufficient resources (e.g., free resources or reserved resources) to transmit the particular packet, and may drop the particular packet or perform another response action.

As shown in FIG. 5C, and by reference number 512, based at least in part on determining resources (e.g., free resources or reserved resources) for reservation in a contention window (e.g., based at least in part on priorities of UEs 120 or priorities of packets for transmission), UE 120 may transmit one or more PSCCH transmissions to indicate a resource reservation of a resource, to transmit payload, to retransmit payload, and/or the like. For example, the UE 120 may transmit a resource including both a two-stage PSCCH and data in a PSSCH occupying the full slot structure illustrated in FIG. 4 within a previously reserved resource.

As indicated above, FIGS. 5A-5C are provided as examples. Other examples may differ from what is described with respect to FIGS. 5A-5C.

Figure 6:
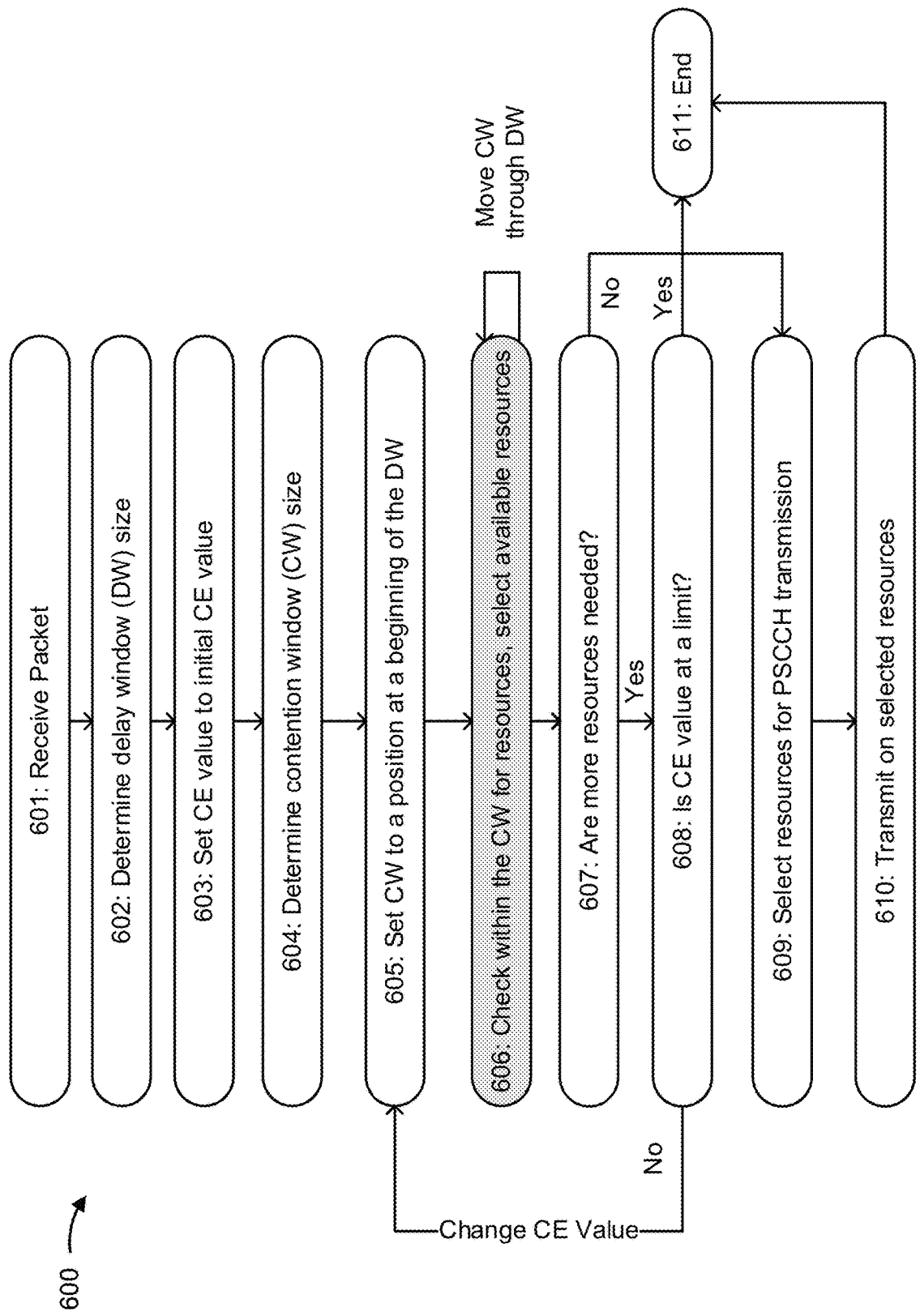
FIGS. 6-8 are diagrams illustrating example processes performed, for example, by a user equipment, in accordance with various aspects of the present disclosure.

FIG. 6 is a diagram illustrating an example process 600 performed, for example, by a UE, in accordance with various aspects of the present disclosure. Example process 600 is an example where UE 120 performs operations associated with resource reservation.

At 601, UE 120 may receive a packet. For example, receiving the packet at 601 may include receiving, within a buffer of the UE 120, a packet or data to be transmitted by the UE 120. For example, the data or packet to be transmitted may originate from internally in the UE 120 from an application or other layer. At 602, UE 120 may set a delay window (DW) size. For example, UE 120 may set the DW size to a greater of a PDB size and an HDB size. At 603, UE 120 may set a control exclusion (CE) value to an initial CE value. At 604, UE 120 may determine a contention window (CW) size. For example, UE 120 may determine the CW size based at least in part on an equation (e.g., CW size=minimum(PDB, HDB)/(N/K)), as described above. In some aspects, the DW may start at the time the packet is received for transmission and have a length of the DW size.

At 605, UE 120 may set the CW to a position at a beginning of the DW. For example, UE 120 may set the CW to a first time interval in the DW for sweeping through the DW to determine available resources (e.g., free resources or reserved resources). At 606, UE 120 may check within the CW for resources, and may select available resources, as described in more detail with regard to FIG. 7 and process 606'. The UE 120 may select and/or reserve the resources by transmitting a PSCCH or other signal indicating reservation of the selected resources. This may allow the UE 120 to notify other UEs of the reservation of those particular resources. For example, if resources are available in the CW (e.g., free resources, reserved resources, and/or the like), UE 120 may select the resources. In some aspects, UE 120 may move the CW forward in time until at an end of the DW.

At 607, UE 120 may determine whether more resources are needed after moving the CW forward in time until the end of the DW and after attempting to override resource reservations of other UEs 120, as described in more detail herein. For example, the UE 120 may check whether additional resources are needed to send the packet. If resources are still needed, at 608, UE 120 may determine if the CE value is at a limit. For example, UE 120 may determine if the CE value is at a maximum value or a minimum value. If yes, at 611, UE 120 may end a procedure, as resources are not available. If not, UE 120 may change the CE value to scale a size of the CE zones, and may return to 605 to set the CW position to the beginning of the DW and determine whether resources are available using the scaled CE zones.

Returning to 607, if UE 120 determines that more resources are not needed, UE 120 may select resources for transmission, at 609. For example, at a particular CW at which enough resources are available, UE 120 may select resources and encode/indicate the selected resources in a PSCCH for transmission. At 610, UE 120 may transmit on the selected resources. At 611, UE 120 may end the procedure having transmitted the packet on the selected resources.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
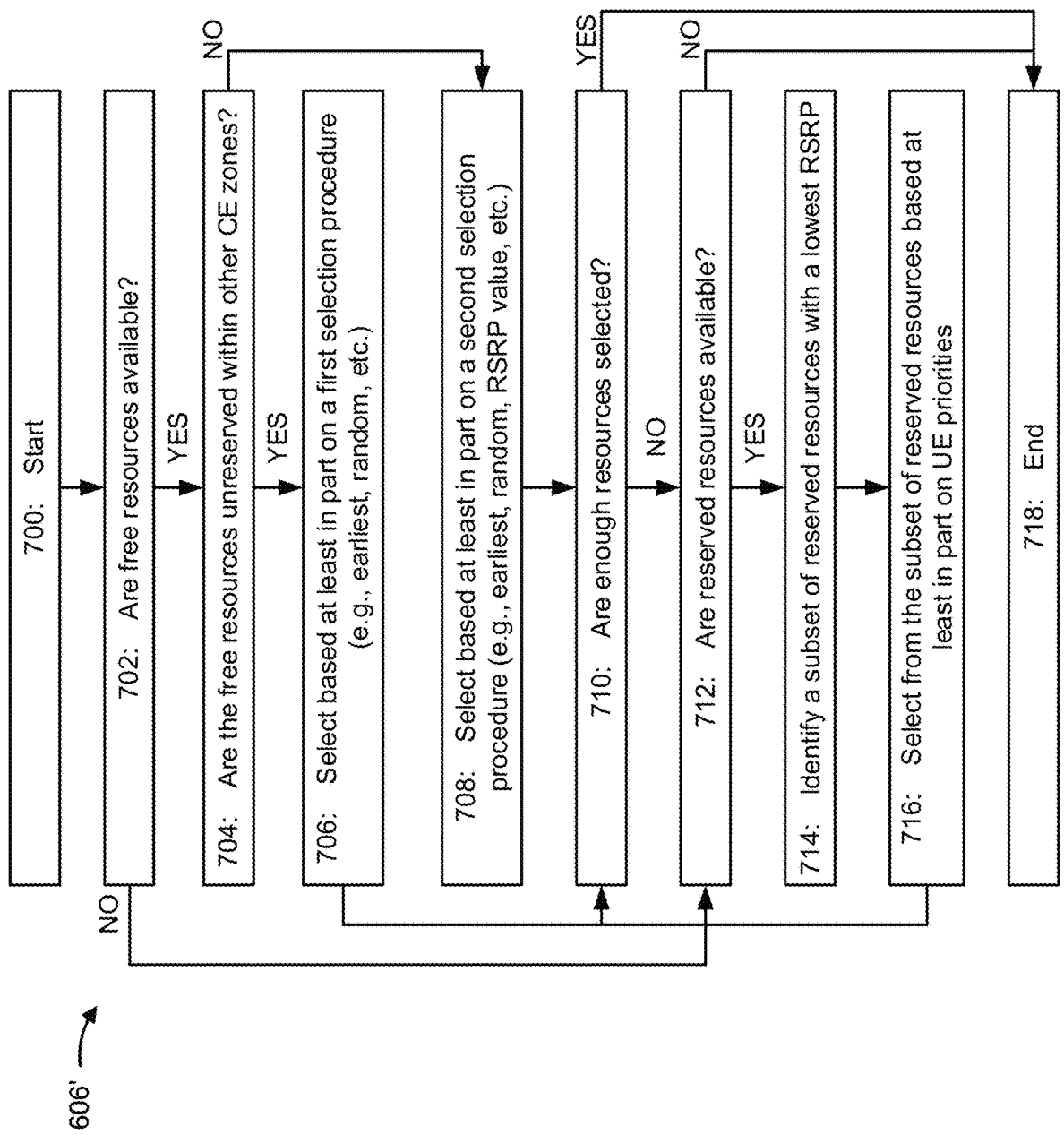

FIG. 7 is a diagram illustrating an example process 606' performed, for example, by a UE, in accordance with various aspects of the present disclosure. Example process 606' is an example where UE 120 performs operations associated with resource reservation.

At 700, UE 120 may start resource reservation. For example, as described above, UE 120 may start resource reservation based at least in part on setting a CW at a particular time interval within a PDB and may continue to perform resource reservation at each possible time interval (and/or within one or more difference CE zone sizes) when sweeping the CW through the PDB.

At 702, UE 120 may determine whether free resources are available. For example, a first UE 120 may determine whether a resource that is unreserved by any second UE 120 is available, whether a resource that is reserved by a second UE 120 for which the first UE 120 is not within a CE zone is available, and/or the like.

At 704, based at least in part on determining that free resources are available, UE 120 may determine whether the free resources are unreserved within one or more other CE zones. For example, UE 120 may determine a type of the free resources (e.g., unreserved or reserved within a CE zone that does not include the UE 120).

At 706, UE 120 may select one or more free resources based at least in part on a first selection procedure. For example, based at least in part on determining that the free resources are unreserved within other CE zones, UE 120 may select one or more free resources based at least in part on an order of the one or more free resources, a random selection procedure, and/or the like.

At 708, UE 120 may select one or more free resources based at least in part on a second selection procedure. For example, based at least in part on determining that the free resources are reserved within other CE zones that do not include UE 120, UE 120 may select one or more free resources based at least in part on an order of the one or more free resources, a random selection procedure, an RSRP associated with the one or more free resources, and/or the like.

At 710, after selecting resources, UE 120 may determine whether enough resources are selected. Based at least in part on selecting one or more free resources, at 706 or 708, UE 120 may determine whether enough resources are selected to transmit a particular packet. Additionally, or alternatively, based at least in part on selecting one or more reserved resources, as described herein at 716, UE 120 may determine whether enough resources are selected to transmit the particular packet.

At 712, UE 120 may determine whether reserved resources are available. For example, based at least in part on free resources not being available, at 702, or selected resources not being enough to transmit a particular packet, at 710, UE 120 may determine whether reserved resources are available. In some aspects, reserved resources may be available when there are resources that have been reserved by another device in the current location of the CW. In one implementation, reserved resources may be considered available when they have a lower priority than the packet to be transmitted by the UE 120 (or another UE 120 that is to transmit the packet has a lower priority than the UE 120).

At 714, based at least in part on determining that reserved resources are available, UE 120 may identify a subset of reserved resources with a lowest RSRP. For example, UE 120 may determine RSRPs of the reserved resources, rank the reserved resources based at least in part on respective RSRPs, and select a subset of reserved resources with lowest respective RSRPs.

At 716, based at least in part on selecting the subset of reserved resources with the lowest respective RSRPs, UE 120 may select one or more reserved resources from the subset of reserved resources based at least in part on UE priorities. In this case, UE 120 may select one or more reserved resources for which UE 120 is associated with a higher priority than another UE 120 that reserved the one or more reserved resources. In this way, UE 120 may override the other UE 120's resource reservation.

In this case, UE 120 may return to 710, and may determine whether enough resources have been selected. If so, UE 120 may end the resource selection procedure, at 718, and reserve resources that have been selected using process 606'. In contrast, if enough resources have not been selected, UE 120 may end the resource selection procedure, at 718, and may scale a CE zone and restart the resource selection procedure, as described above in relation to FIG. 6 at 608. Alternatively, if enough resources have not been selected, and for example, the CE zone cannot be further scaled, UE 120 may determine to drop transmission of the particular packet. Alternatively, UE 120 may wait for a next transmission time interval (TTI) in which to reserve resources to transmit the particular packet.

Although FIG. 7 shows example blocks of process 606', in some aspects, process 606' may include additional blocks, fewer blocks, different blocks, or differently arranged blocks than those depicted in FIG. 7. Additionally, or alternatively, two or more of the blocks of process 606' may be performed in parallel.

Figure 8:
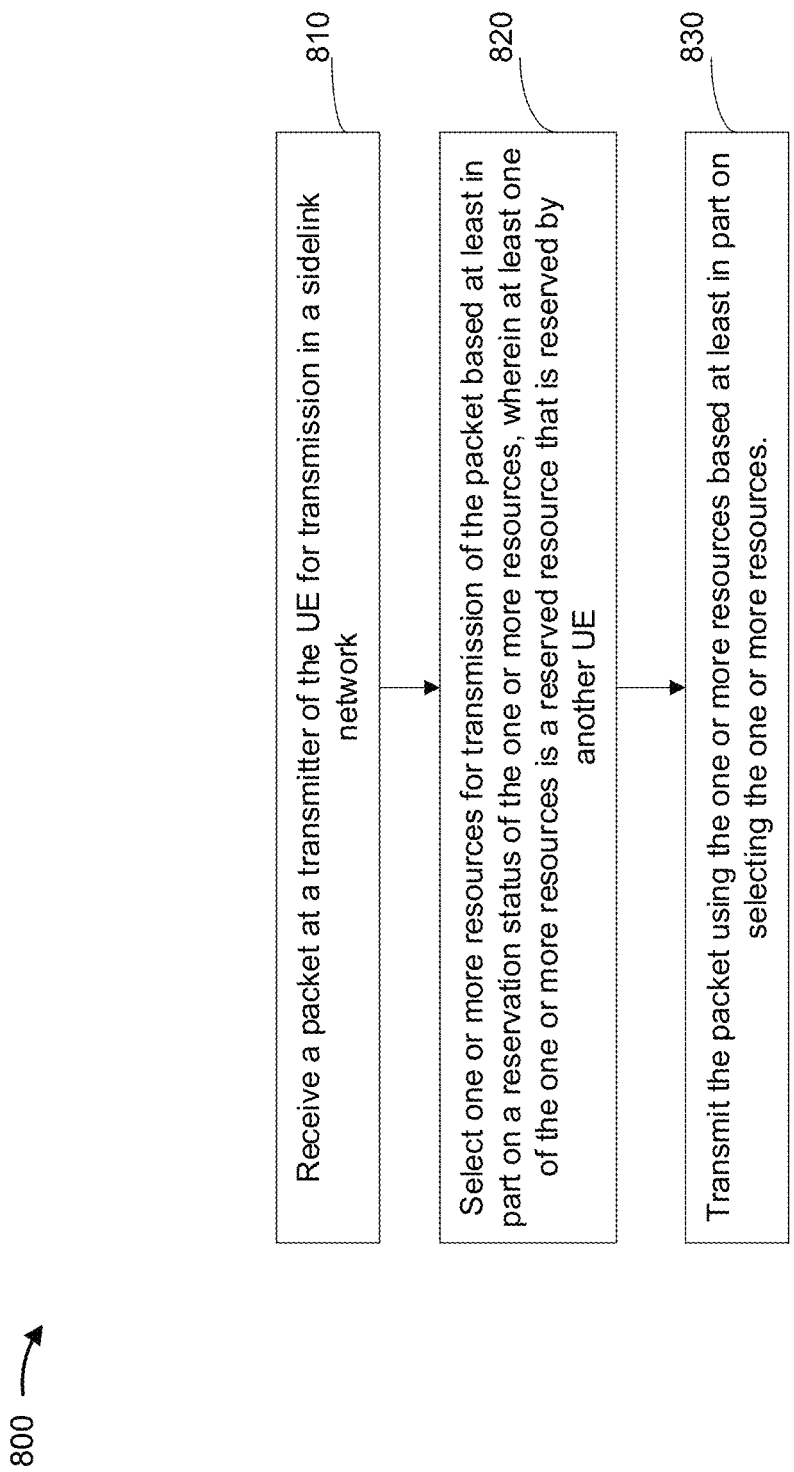

FIG. 8 is a diagram illustrating an example process 800 performed, for example, by a UE, in accordance with various aspects of the present disclosure. Example process 800 is an example where a UE (e.g., UE 120 and/or the like) performs operations associated with sidelink network resource reservation.

As shown in FIG. 8, in some aspects, process 800 may include receiving a packet at a transmitter of the UE for transmission in a sidelink network (block 810). For example, the UE (e.g., using receive processor 258, transmit processor 264, controller/processor 280, memory 282, and/or the like) may receive a packet at a transmitter of the UE for transmission in a sidelink network, as described above.

As further shown in FIG. 8, in some aspects, process 800 may include selecting one or more resources for transmission of the packet based at least in part on a reservation status of the one or more resources, wherein at least one of the one or more resources is a reserved resource that is reserved by another UE (block 820). For example, the UE (e.g., using receive processor 258, transmit processor 264, controller/processor 280, memory 282, and/or the like) may select one or more resources for transmission of the packet based at least in part on a reservation status of the one or more resources, as described above. In some aspects, at least one of the one or more resources is a reserved resource that is reserved by another UE.

As further shown in FIG. 8, in some aspects, process 800 may include transmitting the packet using the one or more resources based at least in part on selecting the one or more resources (block 830). For example, the UE (e.g., using receive processor 258, transmit processor 264, controller/processor 280, memory 282, and/or the like) may transmit the packet using the one or more resources based at least in part on selecting the one or more resources, as described above.

Process 800 may include additional aspects, such as any single aspect or any combination of aspects described below and/or in connection with one or more other processes described elsewhere herein.

In a first aspect, selecting the one or more resources includes determining a set of free resources; and selecting one or more free resources, from the set of free resources, as the one or more resources based at least in part on at least one of an order of the one or more free resources or a random selection procedure.

In a second aspect, alone or in combination with the first aspect, the one or more free resources includes at least one resource that is not reserved by any other UE for which the UE is within a control exclusion (CE) zone.

In a third aspect, alone or in combination with one or more of the first and second aspects, selecting the one or more resources includes determining a set of reserved resources reserved by one or more other UEs for which the UE is not within a CE zone; and selecting one or more reserved resources, from the set of reserved resources, as the one or more resources based at least in part on at least one of an order of the set of reserved resources, a random selection procedure, or a reference signal received power characteristic.

In a fourth aspect, alone or in combination with one or more of the first through third aspects, selecting the one or more resources includes determining a set of reserved resources reserved by one or more other UEs for which the UE is within a CE zone; selecting a subset of the set of reserved resources based at least in part on a set of reference signal received powers of the set of reserved resources; and selecting one or more reserved resources, from the subset of the set of reserved resources, as the one or more resources based at least in part on a priority of the UE relative to one or more other priorities of the one or more other UEs.

In a fifth aspect, alone or in combination with one or more of the first through fourth aspects, selecting the one or more resources includes determining a set of reserved resources reserved by one or more other UEs for which the UE is within a CE zone; selecting a subset of the set of reserved resources based at least in part on a priority of the UE relative to one or more other priorities of the one or more other UEs; and selecting one or more reserved resources, from the subset of the set of reserved resources, as the one or more resources based at least in part on a set of reference signal received powers of the subset of the set of reserved resources.

In a sixth aspect, alone or in combination with one or more of the first through fifth aspects, selecting the one or more resources includes attempting to select the one or more resources with a particular value for a CE zone; determining that a threshold amount of resources is not selectable according to a selection procedure with the particular value for the CE zone; scaling a value for the CE zone using a scaling factor based at least in part on determining that the threshold amount of resources is not selectable according to the selection procedure with the particular value for the CE zone; and attempting to select the one or more resources using the selection procedure based at least in part on scaling the value for the CE zone.

In a seventh aspect, alone or in combination with one or more of the first through sixth aspects, selecting the one or more resources includes attempting to select the one or more resources within a particular transmission time interval (TTI); determining that a threshold amount of resources is not selectable according to a selection procedure within the particular TTI; and attempting to select the one or more resources using the selection procedure in a next TTI after the particular TTI.

In an eighth aspect, alone or in combination with one or more of the first through seventh aspects, selecting the one or more resources includes attempting to select the one or more resources within a contention window and within a packet delay budget (PDB); determining that a threshold amount of resources is not selectable according to a selection procedure within the contention window and within the PDB; sweeping the contention window within the PDB based at least in part on determining that the threshold amount of resources is not selectable according to the selection procedure within the contention window; and attempting to select the one or more resources using the selection procedure when sweeping the contention window.

In a ninth aspect, alone or in combination with one or more of the first through eighth aspects, the one or more resources include at least one of a transmission resource, a retransmission resource, or a reservation resource.

In a tenth aspect, alone or in combination with one or more of the first through ninth aspects, process 800 may include transmitting a reservation message using at least one of the one or more resources to cause a lower priority UE to release another at least one of the one or more resources for transmission of the packet.

In an eleventh aspect, alone or in combination with one or more of the first through tenth aspects, process 800 may include determining that at least one of the one or more resources is preempted by a higher priority UE; and reselecting at least one replacement resource from a set of free resources after determining that the at least one of the one or more resources is preempted by the higher priority UE.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving a packet at a transmitter of the UE for transmission in a sidelink network;
   attempting to select one or more resources for transmission of the packet based at least in part on a resource reservation associated with another UE reserving at least one resource of the one or more resources,
      wherein the UE attempts to select the one or more resources in a particular transmission time interval (TTI) based at least in part on: the UE previously attempting to select the one or more resources within a previous TTI, and a threshold amount of resources not selectable within the previous TTI, or
      wherein the UE attempts to select the one or more resources when sweeping a contention window within a packet delay budget (PDB) based at least in part on: the UE previously attempting to select the one or more resources within the contention window and the PDB, and the threshold amount of resources not selectable within the contention window and the PDB; and transmitting the packet using the one or more resources based at least in part on selecting the one or more resources based at least in part on attempting to select the one or more resources.

2. The method of claim 1, wherein attempting to select the one or more resources comprises:
determining a set of free resources; and
attempting to select one or more free resources, from the set of free resources, as the one or more resources based at least in part on at least one of an order of the one or more free resources or a random selection procedure.

3. The method of claim 2, wherein the one or more free resources include at least one resource that is not reserved by one or more other UEs, including the other UE, for which the UE is within a control exclusion (CE) zone.

4. The method of claim 1, wherein attempting to select the one or more resources comprises:
determining a set of reserved resources reserved by one or more other UEs, including the other UE, for which the UE is not within a control exclusion (CE) zone; and
attempting to select one or more reserved resources, from the set of reserved resources, as the one or more resources based at least in part on at least one of an order of the set of reserved resources, a random selection procedure, or a reference signal received power characteristic.

5. The method of claim 1, wherein attempting to select the one or more resources comprises:
determining a set of reserved resources reserved by one or more other UEs, including the other UE, for which the UE is within a control exclusion (CE) zone;
selecting a subset of the set of reserved resources based at least in part on a set of reference signal received powers of the set of reserved resources; and
attempting to select one or more reserved resources, from the subset of the set of reserved resources, as the one or more resources based at least in part on a priority of the UE relative to one or more other priorities of the one or more other UEs.

6. The method of claim 1, wherein attempting to select the one or more resources comprises:
determining a set of reserved resources reserved by one or more other UEs, including the other UE, for which the UE is within a control exclusion (CE) zone;
selecting a subset of the set of reserved resources based at least in part on a priority of the UE relative to one or more other priorities of the one or more other UEs; and
attempting to select one or more reserved resources, from the subset of the set of reserved resources, as the one or more resources based at least in part on a set of reference signal received powers of the subset of the set of reserved resources.

7. The method of claim 1, wherein attempting to select the one or more resources comprises:
attempting to select the one or more resources with a particular value for a control exclusion (CE) zone;
determining that the threshold amount of resources is not selectable according to the selection procedure with the particular value for the CE zone;
scaling a value for the CE zone using a scaling factor based at least in part on determining that the threshold amount of resources is not selectable according to the selection procedure with the particular value for the CE zone; and
attempting to select the one or more resources using the selection procedure based at least in part on scaling the value for the CE zone.

8. The method of claim 1, wherein attempting to select the one or more resources comprises:
attempting to select the one or more resources within the previous TTI;
determining that the threshold amount of resources is not selectable according to a selection procedure within the previous TTI; and
attempting to select the one or more resources using the selection procedure in the particular TTI after the previous TTI.

9. The method of claim 1, wherein attempting to select the one or more resources comprises:
attempting to select the one or more resources within the contention window and the PDB;
determining that the threshold amount of resources is not selectable according to a selection procedure within the contention window and the PDB;
sweeping the contention window within the PDB based at least in part on determining that the threshold amount of resources is not selectable according to the selection procedure within the contention window; and
attempting to select the one or more resources using the selection procedure when sweeping the contention window.

10. The method of claim 1, wherein the one or more resources include at least one of a transmission resource, a retransmission resource, or a reservation resource.

11. The method of claim 1, further comprising:
transmitting a reservation message using at least one of the one or more resources to cause a lower priority UE to release another at least one of the one or more resources for transmission of the packet.

12. The method of claim 1, further comprising:
determining that at least one of the one or more resources is preempted by a higher priority UE; and
reselecting at least one replacement resource from a set of free resources after determining that the at least one of the one or more resources is preempted by the higher priority UE.

13. A user equipment (UE) for wireless communication, comprising:
a memory; and
one or more processors coupled to the memory, the one or more processors configured to:
receive a packet at a transmitter of the UE for transmission in a sidelink network;
attempt to select one or more resources for transmission of the packet based at least in part on a resource reservation associated with another UE reserving at least one resource of the one or more resources,
wherein the UE attempts to select the one or more resources in a particular transmission time interval (TTI) based at least in part on: the UE previously attempting to select the one or more resources within a previous TTI, and a threshold amount of resources not selectable within the previous TTI, or
wherein the UE attempts to select the one or more resources when sweeping a contention window within a packet delay budget (PDB) based at least in part on: the UE previously attempting to select the one or more resources within the contention window and the PDB, and the threshold amount of resources not selectable within the contention window and the PDB; and
transmit the packet using the one or more resources based at least in part on selecting the one or more resources based at least in part on attempting to select the one or more resources.

14. The UE of claim 13, wherein the one or more processors, when attempting to select the one or more resources, are to:
  determine a set of free resources; and
  attempt select one or more free resources, from the set of free resources, as the one or more resources based at least in part on at least one of an order of the one or more free resources or a random selection procedure.

15. The UE of claim 14, wherein the one or more free resources include at least one resource that is not reserved by one or more other UEs, including the other UE, for which the UE is within a control exclusion (CE) zone.

16. The UE of claim 13, wherein the one or more processors, when attempting to select the one or more resources, are to:
  determine a set of reserved resources reserved by one or more other UEs, including the other UE, for which the UE is not within a control exclusion (CE) zone; and
  attempt to select one or more reserved resources, from the set of reserved resources, as the one or more resources based at least in part on at least one of an order of the set of reserved resources, a random selection procedure, or a reference signal received power characteristic.

17. The UE of claim 13, wherein the one or more processors, when attempting to select the one or more resources, are to:
  determine a set of reserved resources reserved by one or more other UEs, including the other UE, for which the UE is within a control exclusion (CE) zone;
  select a subset of the set of reserved resources based at least in part on a set of reference signal received powers of the set of reserved resources; and
  attempt to select one or more reserved resources, from the subset of the set of reserved resources, as the one or more resources based at least in part on a priority of the UE relative to one or more other priorities of the one or more other UEs.

18. The UE of claim 13, wherein the one or more processors, when attempting to select the one or more resources, are to:
  determine a set of reserved resources reserved by one or more other UEs, including the other UE, for which the UE is within a control exclusion (CE) zone;
  select a subset of the set of reserved resources based at least in part on a priority of the UE relative to one or more other priorities of the one or more other UEs; and
  attempt to select one or more reserved resources, from the subset of the set of reserved resources, as the one or more resources based at least in part on a set of reference signal received powers of the subset of the set of reserved resources.

19. The UE of claim 13, wherein the one or more processors, when attempting to select the one or more resources, are to:
  attempt to select the one or more resources with a particular value for a control exclusion (CE) zone;
  determine that the threshold amount of resources is not selectable according to a selection procedure with the particular value for the CE zone;
  scale a value for the CE zone using a scaling factor based at least in part on determining that the threshold amount of resources is not selectable according to the selection procedure with the particular value for the CE zone; and
  attempt to select the one or more resources using the selection procedure based at least in part on scaling the value for the CE zone.

20. The UE of claim 13, wherein the one or more processors, when attempting to select the one or more resources, are to:
  attempt to select the one or more resources within the previous TTI;
  determine that the threshold amount of resources is not selectable according to a selection procedure within the previous TTI; and
  attempt to select the one or more resources using the selection procedure in the particular TTI after the particular TTI.

21. The UE of claim 13, wherein the one or more processors, when attempting to select the one or more resources, are to:
  attempt to select the one or more resources within the contention window and within the PDB;
  determine that the threshold amount of resources is not selectable according to a selection procedure within the contention window and within the PDB;
  sweep the contention window within the PDB based at least in part on determining that the threshold amount of resources is not selectable according to the selection procedure within the contention window; and
  attempt to select the one or more resources using the selection procedure when sweeping the contention window.

22. The UE of claim 13, wherein the one or more resources include at least one of a transmission resource, a retransmission resource, or a reservation resource.

23. The UE of claim 13, wherein the one or more processors are further configured to:
  transmit a reservation message using at least one of the one or more resources to cause a lower priority UE to release another at least one of the one or more resources for transmission of the packet.

24. The UE of claim 13, wherein the one or more processors are further configured to:
  determine that at least one of the one or more resources is preempted by a higher priority UE; and
  reselect at least one replacement resource from a set of free resources after determining that the at least one of the one or more resources is preempted by the higher priority UE.

25. A non-transitory computer-readable medium storing one or more instructions for wireless communication, the one or more instructions comprising:
  one or more instructions that, when executed by one or more processors of a user equipment (UE), cause the one or more processors to:
    receive a packet at a transmitter of the UE for transmission in a sidelink network;
    attempt to select one or more resources for transmission of the packet based at least in part on a resource reservation associated with another UE reserving one resource of the one or more resources,
      wherein the UE attempts to select the one or more resources in a particular transmission time interval (TTI) based at least in part on: the UE previously attempting to select the one or more resources within a previous TTI, and a threshold amount of resources not selectable within the previous TTI, or
      wherein the UE attempts to select the one or more resources when sweeping a contention window within a packet delay budget (PDB) based at least in part on: the UE previously attempting to select the one or more resources within the contention window and the PDB, and the threshold amount of resources not selectable within the contention window and the PDB; and transmit the packet using the one or more resources based at least in part on selecting the one or more resources based at least in part on attempting to select the one or more resources.

26. The non-transitory computer-readable medium of claim 25, wherein the one or more instructions, that cause the one or more processors to attempt to select the one or more resources, cause the one or more processors to:

determine a set of free resources; and attempt to select one or more free resources, from the set of free resources, as the one or more resources based at least in part on at least one of an order of the one or more free resources or a random selection procedure.

27. The non-transitory computer-readable medium of claim 26, wherein the one or more free resources includes at least one resource that is not reserved by one or more other UEs, including the other UE, for which the UE is within a control exclusion (CE) zone.

28. The non-transitory computer-readable medium claim 25, wherein the one or more instructions, that cause the one or more processors to attempt to select the one or more resources, cause the one or more processors to:

determine a set of reserved resources reserved by one or more other UEs, including the other UE, for which the UE is not within a control exclusion (CE) zone; and attempt to select one or more reserved resources, from the set of reserved resources, as the one or more resources based at least in part on at least one of an order of the set of reserved resources, a random selection procedure, or a reference signal received power characteristic.

29. An apparatus for wireless communication, comprising:

means for receiving a packet at a transmitter of the apparatus for transmission in a sidelink network;

means for attempting to select one or more resources for transmission of the packet based at least in part on a resource reservation associated with another apparatus reserving one resource of the one or more resources, wherein the apparatus attempts to select the one or more resources in a particular transmission time interval (TTI) based at least in part on: the UE previously attempting to select the one or more resources within a previous TTI, and a threshold amount of resources not selectable within the previous TTI, or wherein the UE attempts to select the one or more resources when sweeping a contention window within a packet delay budget (PDB) based at least in part on: the UE previously attempting to select the one or more resources within the contention window and the PDB, and the threshold amount of resources not selectable within the contention window and the PDB; and means for transmitting the packet using the one or more resources based at least in part on selecting the one or more resources based at least in part on attempting to select the one or more resources.

30. The apparatus of claim 29, wherein the means for attempting to select the one or more resources comprises:

means for determining a set of free resources; and means for attempting to select one or more free resources, from the set of free resources, as the one or more resources based at least in part on at least one of an order of the one or more free resources or a random selection procedure.

* * * * *